May 28, 1940. D. E. PATTERSON Re. 21,468

FIBER SEPARATING MACHINE

Original Filed Feb. 19, 1932 8 Sheets-Sheet 1

INVENTOR
DAVID E. PATTERSON
BY HIS ATTORNEYS

Howson and Howson

May 28, 1940. D. E. PATTERSON Re. 21,468

FIBER SEPARATING MACHINE

Original Filed Feb. 19, 1932 8 Sheets-Sheet 2

INVENTOR
DAVID E. PATTERSON
BY HIS ATTORNEYS
Howson and Howson

May 28, 1940. D. E. PATTERSON Re. 21,468

FIBER SEPARATING MACHINE

Original Filed Feb. 19, 1932 8 Sheets-Sheet 3

INVENTOR
DAVID E. PATTERSON
BY HIS ATTORNEYS
Howson and Howson

May 28, 1940. D. E. PATTERSON Re. 21,468

FIBER SEPARATING MACHINE

Original Filed Feb. 19, 1932 8 Sheets-Sheet 4

INVENTOR
DAVID E. PATTERSON
BY HIS ATTORNEYS
Howson and Howson

May 28, 1940. D. E. PATTERSON Re. 21,468

FIBER SEPARATING MACHINE

Original Filed Feb. 19, 1932 8 Sheets-Sheet 5

INVENTOR
DAVID E. PATTERSON
BY HIS ATTORNEYS
Howson and Howson

May 28, 1940. D. E. PATTERSON Re. 21,468

FIBER SEPARATING MACHINE

Original Filed Feb. 19, 1932 8 Sheets-Sheet 6

INVENTOR
DAVID E. PATTERSON
BY HIS ATTORNEYS
Howson and Howson

May 28, 1940. D. E. PATTERSON Re. 21,468

FIBER SEPARATING MACHINE

Original Filed Feb. 19, 1932 8 Sheets-Sheet 7

INVENTOR
DAVID E. PATTERSON
BY HIS ATTORNEYS

Howson and Howson

May 28, 1940. D. E. PATTERSON Re. 21,468
FIBER SEPARATING MACHINE
Original Filed Feb. 19, 1932 8 Sheets-Sheet 8
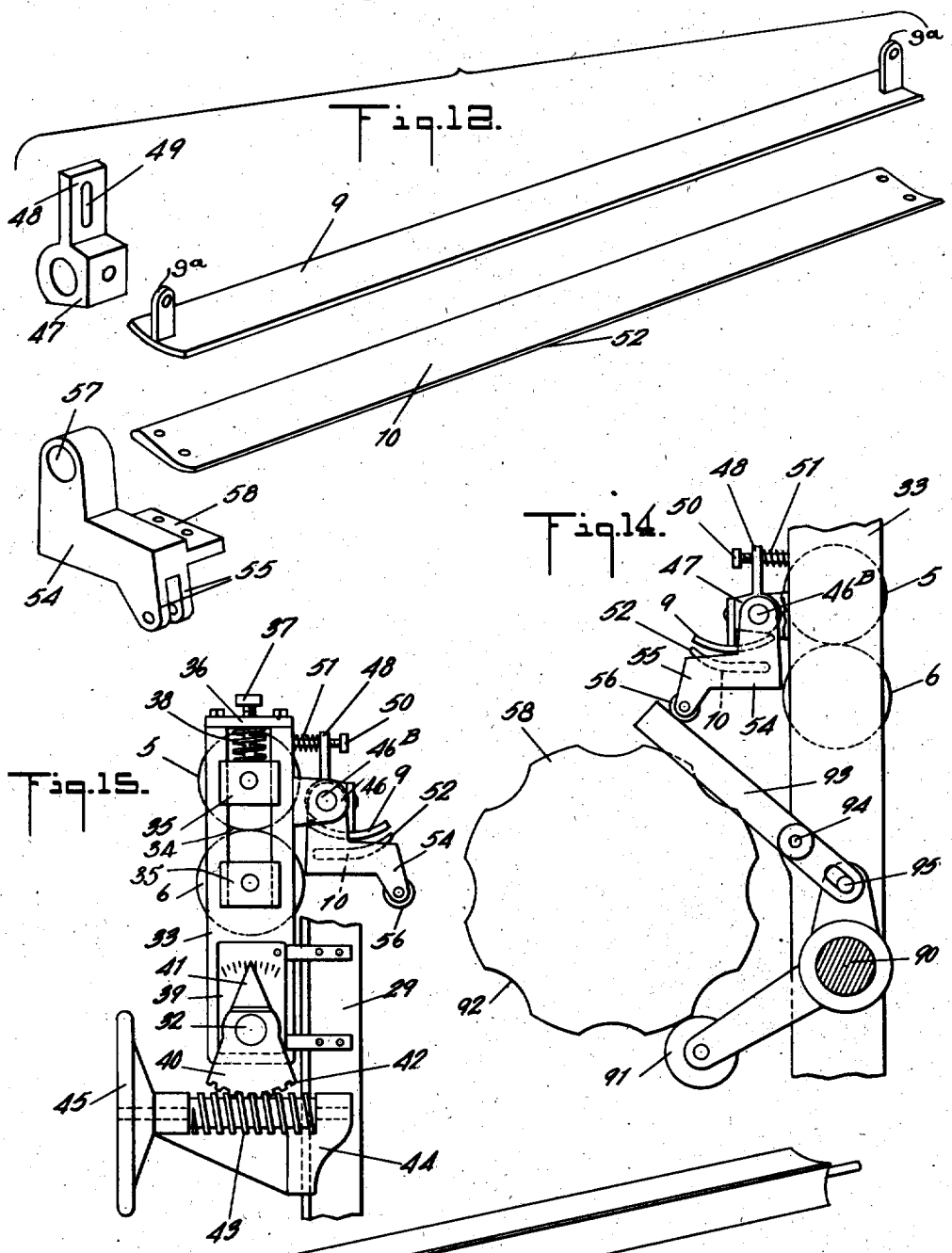
INVENTOR
DAVID E. PATTERSON
BY HIS ATTORNEYS
Howson and Howson Reissued May 28, 1940

Re. 21,468

UNITED STATES PATENT OFFICE 21,468

FIBER SEPARATING MACHINE

David E. Patterson, Philadelphia, Pa., assignor to Consolidated Fibre Products, Limited, a corporation of the Bahama Islands Original No. 2,079,661, dated May 11, 1937, Serial No. 594,070, February 19, 1932. Application for reissue August 9, 1938, Serial No. 223,994

13 Claims. (Cl. 19—30)

This invention relates to machines for extracting fibers from plants such as flax, hemp, ramie, sisal grass and the like.

Machines of the foregoing type as heretofore made have been unsatisfactory in that they injure the fibers during the process of separating them from the woody parts, due to too strenuous treatment of the plant stalks or material between compression rolls or by whipping devices, thus causing an excessive amount of tow. The ideal of a finished fiber should be long and ribbony in nature.

It is an object of this invention to provide an improved machine for separating the woody part of fibrous plant stems from the fibrous parts without injuring the fibers.

Another object is to provide a machine which will produce fibers of ribbony nature as a result of scutching operations in the machine.

Another object is to provide a machine which will subject fibrous stalks and the like to a smoothly operating continuous treatment, without shock, for the purpose of removing the shives or woody parts of the stalks.

Other objects and advantages of my invention will appear as the invention is described in the accompanying drawings.

In the drawings:

Fig. 11 is a perspective view of one of the scutchers;

Fig. 12 is an exploded perspective view of the compression and breaker bars and their supporting hardware;

Fig. 14 is an end view of Fig. 13 with the operating cam added;

Fig. 15 is a fragmentary side elevational view showing the means for operating the breaker bar and feed rollers to adjusted position;

Figure 1:
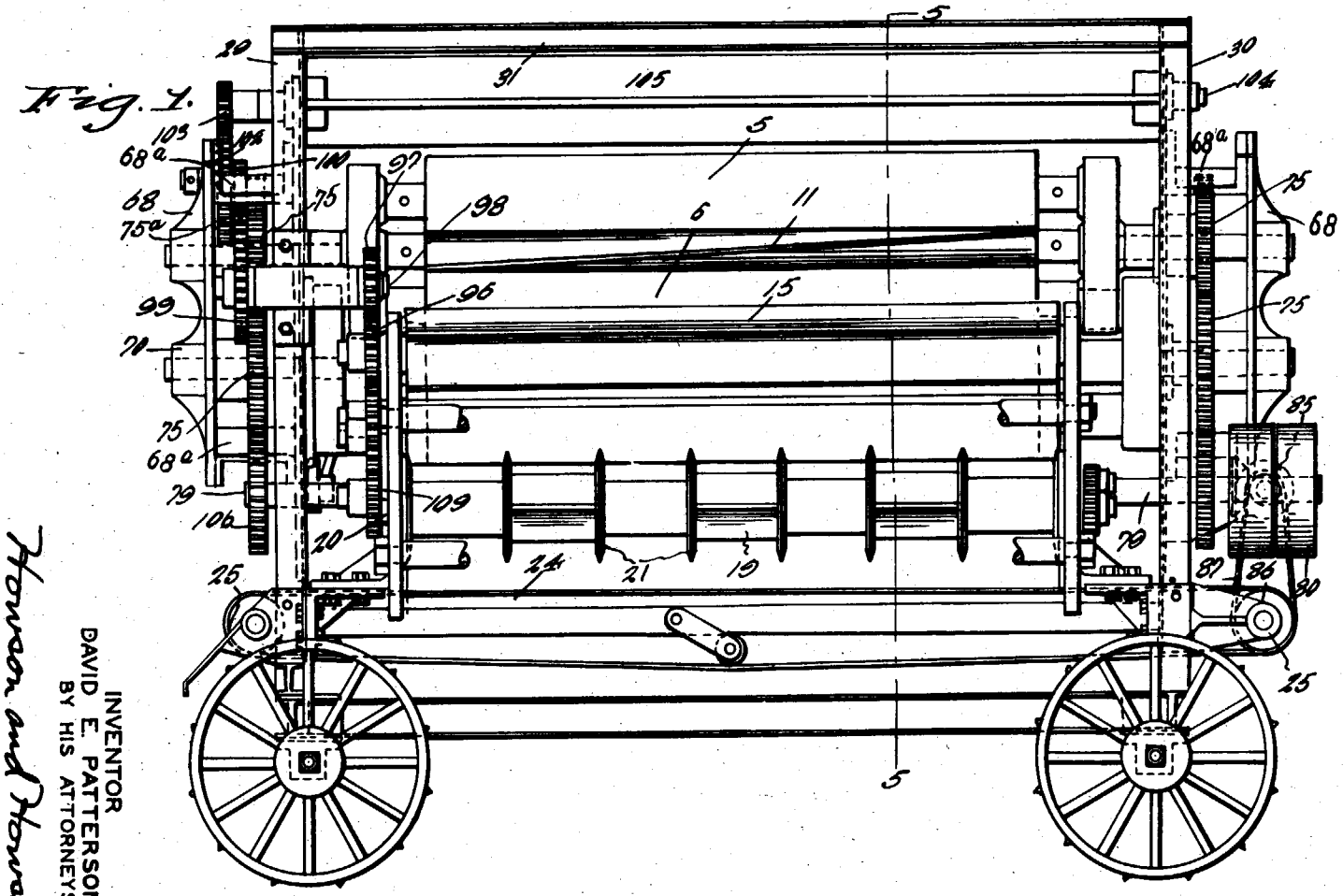
Fig. 1 is a rear elevation view of the invention looking into the discharging end thereof.

Considered broadly, the invention, as embodied in the machine illustrated, treats a layer of stalks 7 of fibrous material by feeding them through a hopper 8 to feed rolls 5, 6 which deliver the stalks between a pair of breaker bars 9 and 10 of which the upper bar 9 is resiliently urged toward the lower, while the lower bar is reciprocated toward and away from the upper bar by mechanism hereinafter more fully described. After leaving the breaker bars, between which the material is alternately gripped firmly and released by the reciprocation of the lower bar, the material is fed between cooperating upper and lower rotary, planetary-gear driven assemblies 13 and 14 in each of which there are blades 11 which have rotary movement about their own axes as well as about the axis of the assembly of which they form a part. The blades of the upper assembly cooperate with the breaker bars to bend and scutch the stalks, removing the woody or non-fibrous portion of the stalk. The lower rotary assembly acts on the underside of the fibers to assist in cleaning of the fibers as will be hereinafter more fully described.

Figure 5:
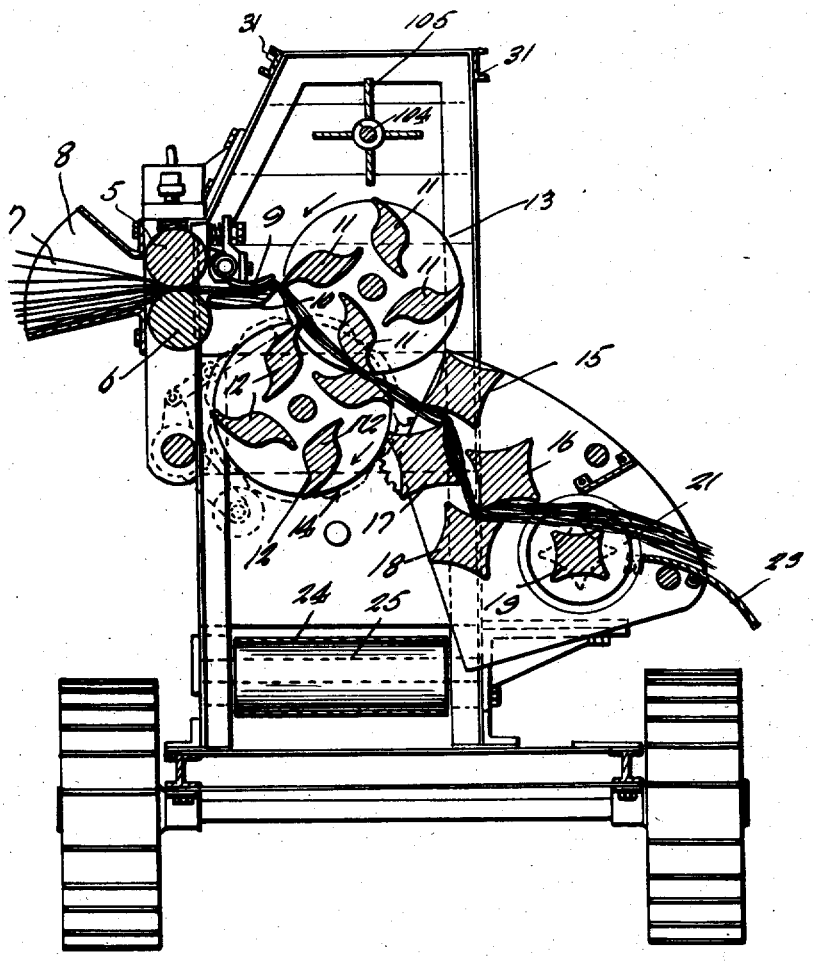
Fig. 5 is a vertical sectional view through the machine taken substantially on line 5—5 of Fig. 1.

From the rotary assemblies or beating devices the fiber is fed to four scutching devices 15–18 rotating on fixed axes, pairs of such scutching devices cooperating in such manner that the edges of one device scrape over and bite into the fiber as that device rotates and while the fiber is backed up by a concave surface on the other cooperating device (see Fig. 5). The scutching devices work on both the upper and lower surfaces of the fiber.

Finally the scutched and cleaned fiber is subjected to the action of a rotating shaking device 19 to remove loose shives before the fiber is taken from the machine for further treatment.

Referring more specifically to the drawings, the machine parts are supported on a framework made up of vertical end frames 29 and 30 which are joined by horizontal U-bars 31.

*The feeding and breaker bar mechanism and adjustments*

Pivotally mounted on a horizontal shaft 32 which is journalled in bearings 29b, 30b, fixed midway of the side edges of the frames 29, 30, is an adjustable mechanism made up of a pair of similar heavy metal arms or standards 33 fixed by set screws on shaft 32 and extending vertically therefrom adjacent opposite ends of the shaft. In the upper ends of standards 33 are formed slots or guideways 34 in which there are slidably mounted bearing blocks 35 rotatably supporting the reduced ends of a pair of parallel cooperating feed rolls 5 and 6 located one above the other in the plane of the guideways. The upper roll 5 may be resiliently mounted by providing compression springs 38 between the bearing blocks 35 of that roll and cap pieces 36 covering the ends of the slots 34. Adjustment bolt 37 passing vertically through each cap 36 and engaging the springs 38 affords means to adjust the pressure of the upper roll.

Also mounted on said standard 33 for the purpose of delivering material to the feed rolls is a hopper 8 of any suitable form.

The stalks passing through the feed rollers are alternately gripped and released by the compression bar 9 and breaker bar 10 both of which are pivotally supported upon the standards 33.

As shown in detail in Fig. 12 the compression bar 9 is a long strip of metal of arcuate form in section and having securing fingers 9a projecting from its end portions normal to the upper surface of the bar. The compression bar is attached at each end to mounting members each consisting of a centrally bored collar portion 47 having a lug 48 extending radially therefrom with a slot 49 therein. Bolts 46a passing through holes in the securing fingers 9a take into internally threaded radial bores in the collar portions 47 to secure the mounting members and compression bars together. For mounting the compression bar pivotally on the standard 33 there is provided on each side of the standard an ear 46 which may be formed integrally with or attached to the standard in any suitable manner to project laterally from the standard. Extending through these ears 46 are coaxial pins 46b about which the compression bar and its supporting members pivot. In order to urge the compression bar resiliently toward the breaker bar 10 below, a pin 50 passes loosely through the slot 49 in lug 48 and into the standard. Coiled around the pin between the lug 48 and the standard 33 is a compression spring 51 whereby the compression bar is urged downwardly.

The breaker bar is in the form of a long strip of metal having a laterally upturned lip 52 in the direction of the compression bar. As the material passes between the breaker and compression bars it is directed upwardly by the lip 52 and is bent down over the lip by the beaters hereinafter described.

The breaker bar 10 is supported on blocks 54 (see Fig. 12) which are formed with a central portion having oppositely directed arms at opposite ends and a laterally extending plate 58 on one side upon which the breaker bar lies and is bolted. In one of the arms of the blocks 54 (such arm extending upwardly) is bored a hole 57 for reception of the pins 46b in order that the breaker bar, as well as the previously described compression bar, may pivot about the same axis. The other of the arms of the block 54 (these other arms extending downwardly) are bifurcated and have pivotally supported between the bifurcations 55, 55, a roller 56 which is engaged with hereinafter described mechanism to rock the breaker bar 10 toward and away from the compression bar 9.

As hereinbefore mentioned the breaker bar is positioned to cooperate with rotary beater blades whose structure and function are hereinafter more particularly described. In order that the clearance between the breaker and blades may be adjusted there is rigidly affixed on the end of shaft 32 a segmental member 40 whose arcuate portion has gear teeth 42 cut thereon. Meshing with the gear teeth 42 is a horizontal worm gear 43 mounted in a bracket 44 affixed to the frame 29 of the machine. A hand wheel 45 is provided on the end of the worm gear for rotating it to turn the segmental member 40, shaft 32, standard 33 and the breaker bar 10, all four of which turn as a unit, so that the rotation of the hand wheel 45 causes adjustment of the breaking clearance between the breaker bar and the beater blades. To indicate the degree of adjustment the apex 41 of the segmental member 40 may act as a pointer, working over dial-like graduations 39 marked on the face of the bearing (for shaft 32) which, it will be recalled, is fixedly supported by the frame 29.

This adjustment of the breaking clearance is essential to take care of the different sizes or thicknesses of stalks or straws of the raw fibers, particularly flax and hemp. Flax averages about one-sixteenth of an inch in diameter, and hemp grows to one-half inch in diameter, therefore, the breaking clearance suitable for flax would destroy all fibers larger than one-sixteenth of an inch. The machine as shown and described and controlled by wheel 45 and worm 43 gives a varying adjustment of breaking clearance from zero, so to speak, to three-fourths of an inch, or more if necessary. All previous fiber separating machines either have no means of adjustment for varying the thicknesses of straws or stalks of the raw fibers, or at best are provided with a crude hand adjustment where the machine must be stopped to make the adjustment, but this requires considerable time and labor.

*The planetary beater blade assemblies*

As may be seen by reference to Fig. 5, there are provided two rotary assemblies 13 and 14 of beater blades 11, 12. The blades of these assemblies are interchangeable but those of the lower assembly are mounted for rotation in the opposite direction to those of the upper assembly and consequently the blades in the lower assembly should be mounted with their scutching edges directed in the opposite direction to those of the upper assembly. But, both assemblies will have their scutching edges of the blades directed in the direction of rotation of the blades.

Figure 6:
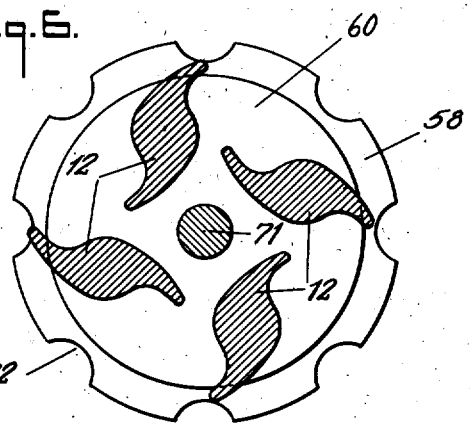
Fig. 6 is a sectional view taken substantially on line 6—6 of Fig. 7.
Figure 10:
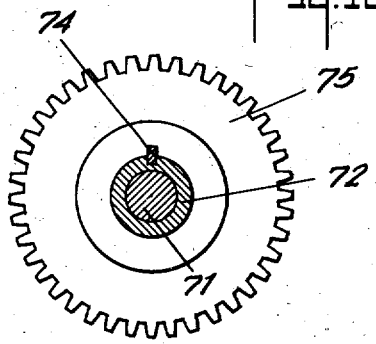
Fig. 10 is a sectional view taken substantially on line 10—10 of Fig. 7.

The beater blades are preferably solid pieces of metal shaped in cross-section substantially as shown in Fig. 6, though other forms of blades may be employed. Preferably the edges of the blades will follow a spiral or helical path of slight curvature so that the blade will progressively cooperate with the breaker bar and material passing over it, beginning at a point at one end of the blade and working toward the other end. Thus the whole blade will not open, or move away from the breaker bar, at once. The cooperation of the beater blades and breaker bar causes the material to be bent over the edge of the breaker bar and the woody center portions of the stalks are broken and slip from the fibrous part.

Figure 16:
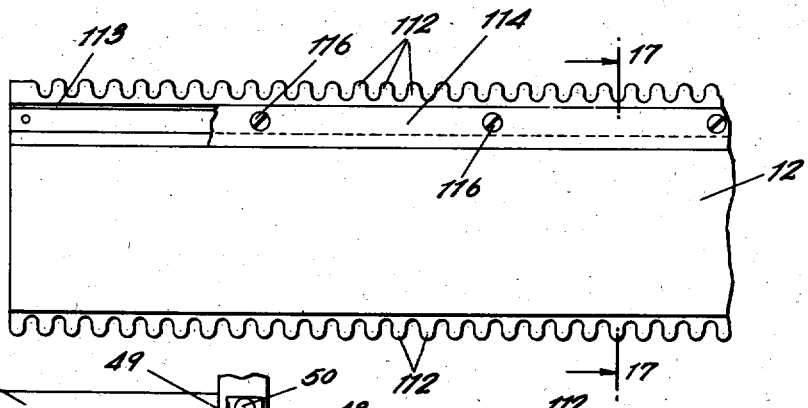
Fig. 16 represents a fragmentary side elevational view of a modified form of beater blade.
Figure 13:
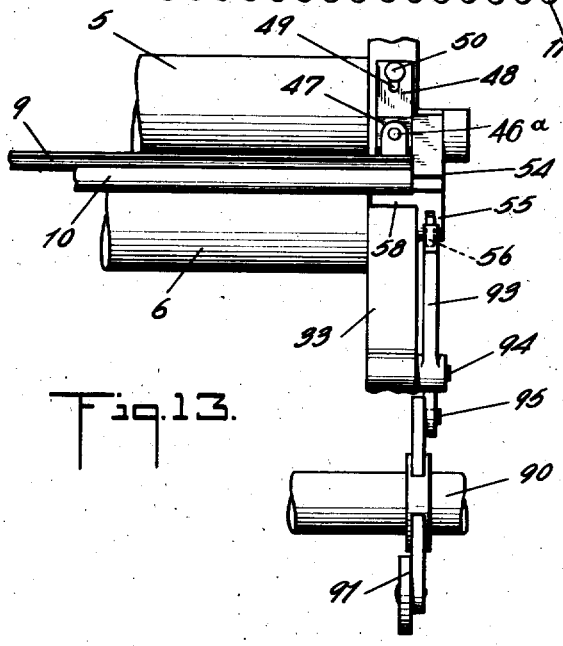
Fig. 13 is a fragmentary detailed elevational view of the breaker and compressor bars and the operating means for the breaker bar.
Figure 17:
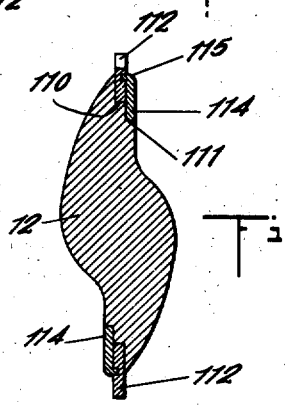
Fig. 17 represents a cross-sectional view taken substantially on line 17—17 of Fig. 16.

The blade edges may be continuous, or serrated as shown in Fig. 16. In the latter case a shoulder 110 may be formed along the front or leading side of the blade edge by cutting into that portion of the blade edge. Against the shoulder a toothed bar 112 having a longitudinally extending groove 113, may be located. Another shoulder 111 may be similarly formed, adjacent the shoulder 110 but further in on the blade, to receive a retaining bar 114 having a laterally turned edge portion 115 adapted to fit within the groove 113. The retaining bar 114 and toothed bar 112 may be held to the edge of the blade by spaced screws 116 passing through both bars and into the body of the blade 11 or 12.

Since the upper and lower assemblies 13, 14 are constructed of identical parts, description of one assembly will suffice.

*Driving mechanism of the beater blade assemblies*

Mounted between the vertical members of the end frames 29—30 of the machine are a series of plates *a*, *b*, *c*, *d* and *e*, serving to close the end of the frame so that a draft of air may be directed through the machine as hereinafter described and also serving as a mounting for a number of machine parts including a bridge bar 68 which is spaced from the plates *b* and *e* by brackets 68[a] located at the ends of the bridge bar and secured thereto and to plates *b* and *c* (see Fig. 1). Mounted in and keyed (by key 73) to a bearing boss 70 in the bridge bar 68 is a stub shaft 71 which extends inwardly through the plate *d* and has keyed on its inner end a small gear 76 that forms the central gear of the planetary gear train by which the beater blades are driven.

Figure 7:
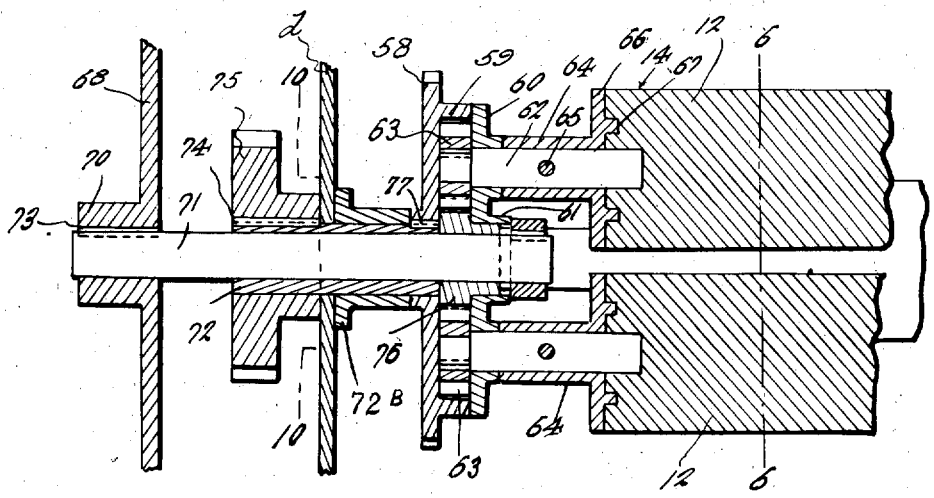
Fig. 7 is a detail sectional view through the beater blades and their actuating mechanism.
Figure 8:
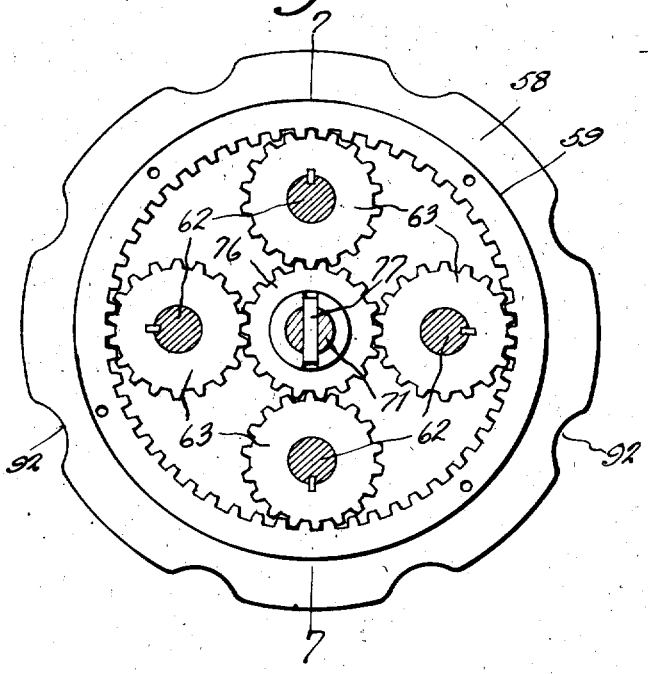
Fig. 8 is a vertical sectional view through the planetary gearing of the beater blade assembly.
Figure 9:
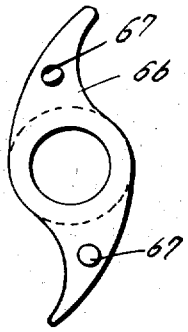
Fig. 9 represents an end elevational view of one of the beater blade supporting members.

Referring to Figs. 7 and 8 it will be seen that there is rotatably mounted on the midportion of the stub shaft 71 a sleeve 72 which extends through the frame plate *d*. To support the sleeve 72, a bearing 72[B] is attached to the frame plate *d* around the opening through which the shaft 71 and sleeve 72 pass. For the purpose of driving the sleeve 72 a gear 75 is keyed by key 74 to the outer end of the sleeve. Keyed on the inner end of the sleeve by key 77 so as to rotate therewith is a gear box 59 housing the planetary gearing by which the beaters 12 are operated.

The gear box 59 is provided with internal gear teeth with which mesh a plurality of spur gears 63 (four are shown for the purpose of illustration). These gears 63 are keyed to and revolve with stud shafts 62 which extend parallel to the stub shaft 71 and through a gear box cover 60 with which they revolve. As may be seen in Fig. 7 the gear box cover revolves on and about the hub of center gear 76 but relatively to the gear box while the gear box revolves with sleeve 72 and drives the planetary gear train. On the ends of the stud shafts 62 are mounted the several beaters of the beater blade assemblies by means of beater blade supporting members having cylindrical portions 64 receiving the shafts 62 and from which end plates 66 extend radially for supporting the beater blades. In order to ensure rotation of the beater blades with the shafts 62 the beater blade supporting members are pinned by pins 65 to the shafts 62 and lugs 67 are provided extending from the plates 66 into recesses in the ends of the beater blades. It may now be observed that as the gear box is rotated about the shaft 71 by gear 75 and sleeve 72, it will mesh with the planet gears 63 on the stud shafts 62 causing rotation of the beater blades 12 about their own axes and at the same time about the fixed axis 71 in a manner readily understandable by those familiar with planetary gear train operation.

*Driving mechanism for compression and breaker bars*

Figure 2:
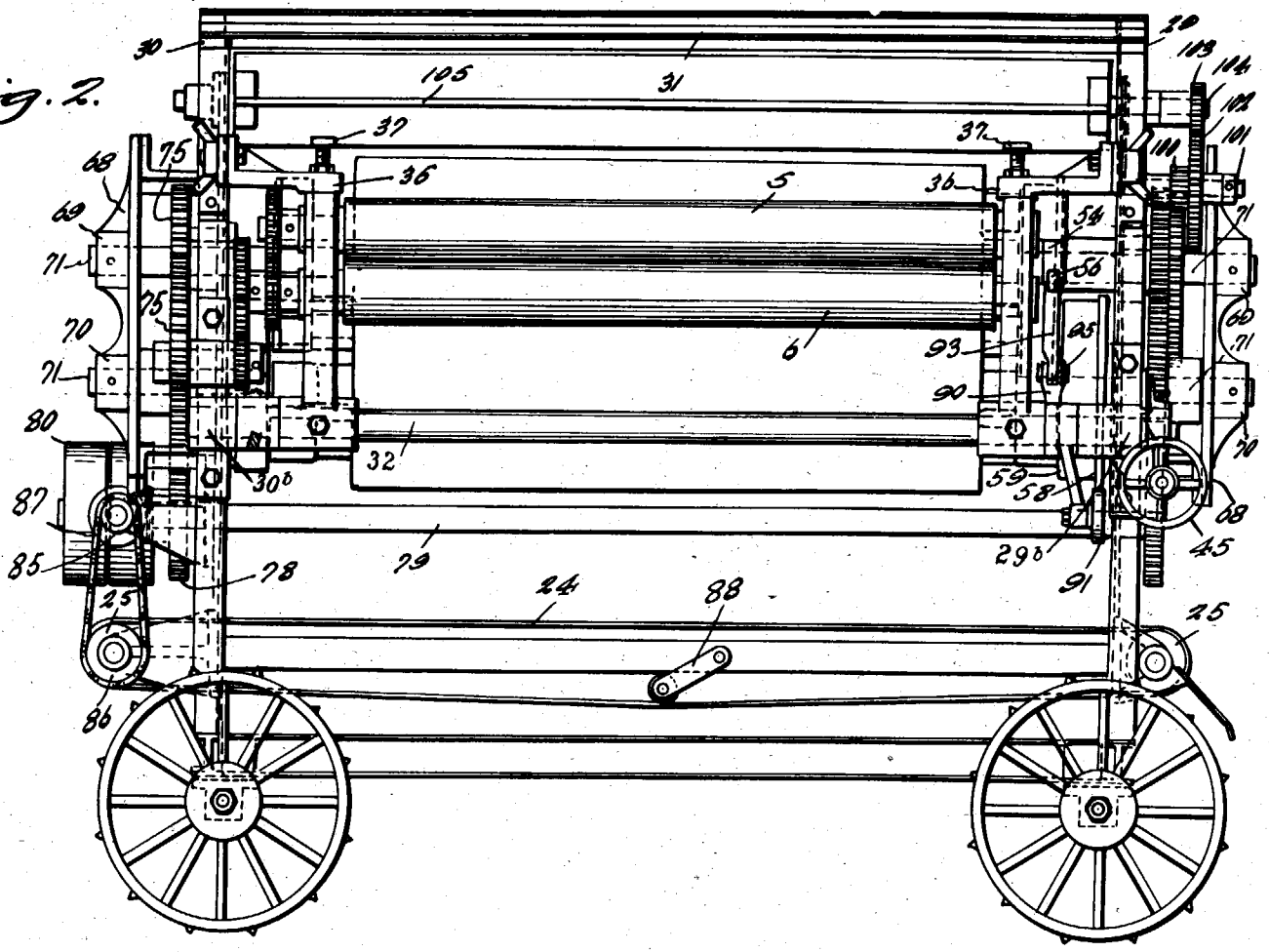
Fig. 2 is a front end elevation view of the invention looking into the feed rollers.

The gear box at the right end (Fig. 2) of the lower beater blade assembly 14 differs from the others in the provision thereon of a cam annulus 58 with which engages a roller 91 on one end of a bell crank 90 which is pivotally mounted on the standard 33. To the other end of this bell crank is loosely pivoted, by pin 95, a lever 93 whose central portion is pivotally mounted on a pin 94 in the standard 33. The free end of this lever 93 engages roller 56 of the breaker bar supporting member. As the cam 58 revolves the low portions 92 receive the roller 91 causing rocking of the bell crank 90 and lever 93 and oscillation of the breaker bar 10 toward and away from compression bar 9.

*Functioning of beater assemblies*

Referring to Fig. 5 it will be observed that by positioning the upper beater blade assembly 13 so that the edges of the blades pass by the edge of the breaker bar—with clearance adjusted by the previously described means so as to suit the material—the stalks will be struck by the beater blades as the stalks are fed over the edge of the breaker bar and the stalks will be bent and the woody parts broken out. The speed of each beater at the moment of striking will be the speed of rotation of the whole beater assembly plus the speed of rotation of the beater about its own axis. Thus with a relatively slowly rotating assembly a rapid or quick striking can be obtained. The number of strikes or beats per minute will be determined by the speed of rotation of the beater assembly and the number of blades which make up the assembly. The number of strikes per unit length of stalk will depend upon the speed of feed of the stalks and the speed of rotation and number of blades in the beater assembly. These factors may all be regulated to suit the particular material being treated, by proper choice and relation of gears and diameters of feed rollers and beater assemblies.

Due to the fact that the beater blades are rotating around their own axes as well as the axis of the whole beater assembly at the moment of striking the fibrous stalks the arc of attack of the beater blades differs from prior devices in that it is of narrower compass and of different shape than the generally wide circular arcs of the prior devices. This distinguishing characteristic of my machine results in better scutching action, cleaner fiber and less tow than in other machines for like purpose.

Another distinguishing characteristic of my machine is the cooperation between the blades of the upper beater assembly and those of the lower as shown in Fig. 5, so that a scutching action on the fiber takes place between the blades of the two assemblies as they rotate.

It will be obvious to those skilled in the art that in putting the principles of my invention into practice the gear ratios may be determined in such manner as to cause the beaters to make one or several rotations about their own axes while making one revolution with the whole beater assembly about the fixed axis of the assembly, provided, however, the edges of the blades shall cooperate with breaker bar in the same manner on each succeeding revolution of the assembly. Therefore I do not limit the invention to any particular number of rotations of the beater blades per revolution of the beater assembly.

An advantage of the solid or closed form of beater blade is that the fibers, shives and tow do not tend to interfere with the operation of the blades by collecting or winding or becoming tangled in between the blades. The blades tend to throw the tow and shives clear of the beater assemblies.

*The cleaning and scutching devices*

After treatment in the beater assemblies the fiber is fed to cleaning and scutching devices 15, 16, 17, 18 comprising thick bars of polygonal iron section with concaved sides. They rotate about parallel fixed axes. The concavity of the sides affords passage in one device for the protruding corners of the adjacent devices as they bite into the fiber between neighboring devices. Specifically, the uppermost device 15 cooperates with the next lower device 17 which also cooperates with the next lower device 16. The lowest device 18 also cooperates with device 16.

In the normal operation of the scutching devices 15 to 18 the length of fiber within the devices 15 to 18 is greater in certain positions of the devices than in other positions, due to the fact that the part of the bight which issues from the beaters 11 and 12 is not always at the same height. This part of the bight is raised or lowered slightly as the position of the individual beaters changes during their rotation and revolution. This raising and lowering tends to create slack at certain times, but the slack never really exists, for any lessening in the required length of the bight results in additional fiber being taken into the scutchers 15 to 18. Consequently when the bight moves further up or down and requires an increase in the length of bight, this increase can only be supplied by pulling the fiber backward through the scutchers 15 to 18, slightly, it being remembered that the compression bar 9 holds the fiber except for intermittent releases as previously described. This retrograde movement of the fiber assists in the scutching action of the scutchers 15 to 18 and tends to clean the fiber more thoroughly.

As a final step in the treatment the fiber is passed over a shaking device 19. This device is made up of a series of short sections which in cross-section are like the scutchers 15 but are angularly spaced and are separated by discs 21 and are mounted on a shaft 20. By means of this device bunching of the fibers is prevented and the discs serve to keep the fibers aligned.

Finally, delivery of the fiber may be over an apron 23 secured to the machine adjacent the shaker device 19.

With some fibers, or for some purposes, it may not be necessary to use all steps of the treatment. Therefore the machine need not be used as a whole to successfully treat fiber but where fibers are sufficiently cleaned in the beater assemblies to permit immediate use of the fiber therefrom further treatments in the machine may be eliminated.

For the purpose of removing the shives as they fall, a conveyor belt 24 is provided passing around belt rollers 25 supported by bearing brackets on the ends of the machine frame. The belt is kept tight by a tensioning device 88 on the underflight of the belt.

Figure 3:
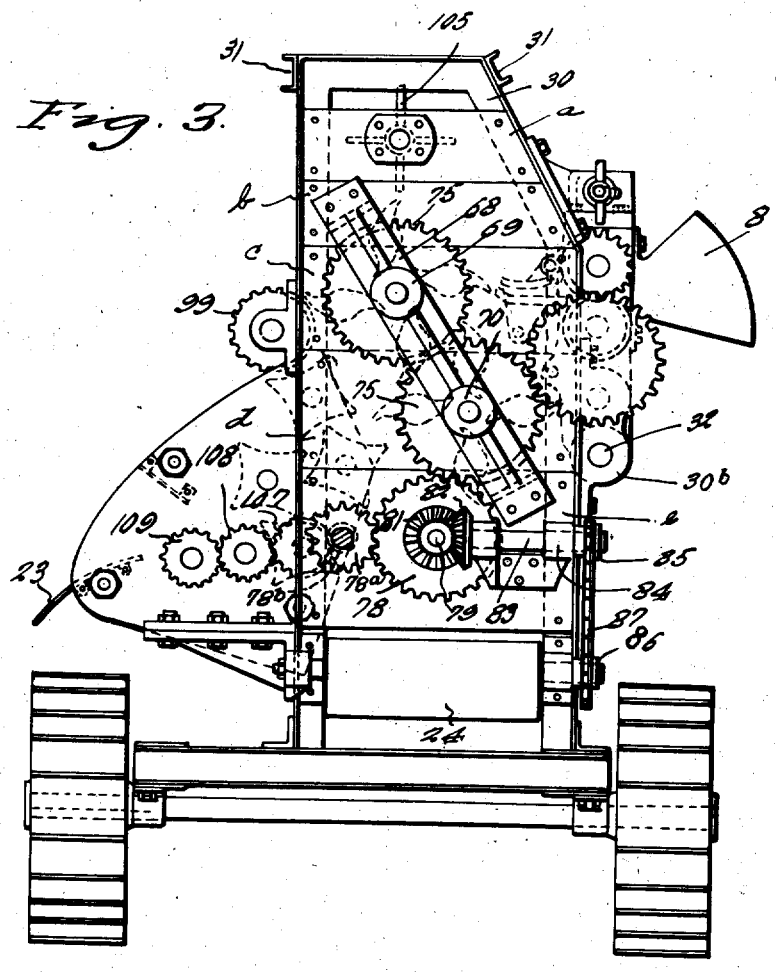
Fig. 3 is a side elevation view of the machine.

Power may be transmitted to the various decorticating devices above described through gear trains from a power shaft 79 which at one end is provided with power pulleys 80 (Fig. 1). At the same end, a beveled gear 81 (Fig. 3) is provided in mesh with the beveled gear 82 on a shaft 83 journaled in bearings 84 of a plate secured to the plate *e*. On the shaft 83 is also a sprocket wheel 85 above a sprocket wheel 86 on the end of the shaft of the conveyor roll 25. A chain 87 is trained over sprockets 85 and 86 whereby power is transmitted to conveyor belt 24.

Figure 4:
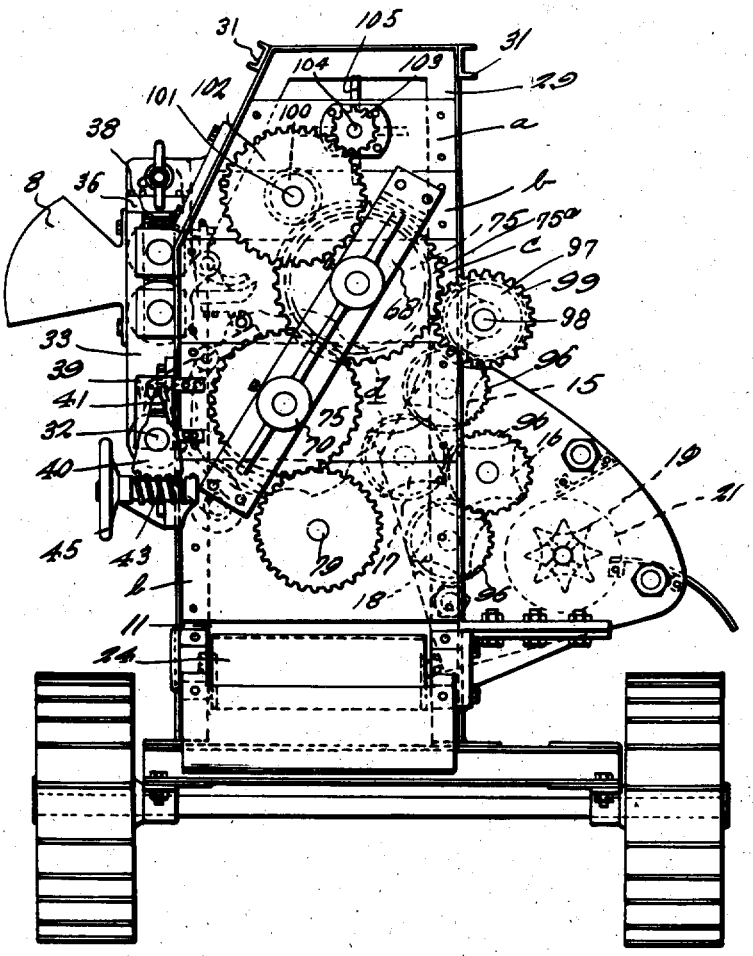
Fig. 4 is a side elevation view of the machine looking at the opposite side from that shown in Fig. 3.

For driving the scutcher members 15–18, intermeshing gears 96 are provided on one end of each scutcher member (see Fig. 4). The lowermost scutcher 18 has a gear 107 (Fig. 3) mounted on the shaft thereof and meshing with a pinion 78[b] on an adjacent stub shaft. On this stub shaft is a gear 78[a] meshing with gear 78 on power shaft 79.

For causing a downward draft of air through the machine a four-bladed impeller 105 on a shaft 104 may be provided in the top of the machine with its bearing in side plates *a*. The top of the machine may be inclosed and provided with an inlet for air. The impeller is driven by a pinion 103 on shaft 104 meshing with a gear 102 on a stub shaft 101. A pinion 100, also on shaft 101, meshes with a large gear 75[a]. This gear 75[a] meshes with a gear 99 on a shaft 98 supported in bearing brackets on the machine frame. Shaft 98 has a gear 97 meshing with the gear 96 of the uppermost scutcher 15. Thus the impeller 105 and its gear train is driven from the scutcher devices' gear train.

For driving the beater assemblies the hereinbefore-mentioned gears 75 are provided. These mesh with each other and the gear 75 of the lower beater assembly also meshes with the power gear 78.

Many modifications within the scope of my invention will occur to those skilled in the art. Therefore I do not limit the invention to the specific embodiment described.

I claim:

1. A machine for separating the material in plant stems comprising feed rollers, and vibratory means for bending the stems at intervals to break open the outside part thereof, supplemental means for removing the pithy interior parts of the stems from the outside fibrous parts, said last-mentioned means comprising a pair of rotary assemblies, each provided with a plurality of longitudinally spiral and individually rotatable blades.

2. A machine for separating the material in plant stems comprising feed rollers, and vibratory means for bending the stems at intervals to break open the outside part thereof, supplemental means for removing the pithy interior parts of the stems from the outside fibrous parts, said last-mentioned means comprising a pair of rotary assemblies, each provided with a plurality of longitudinally spiral and individually rotatable blades, the blades of one group being successively engageable with the bending means for effecting the bending of the material, the blades of the other group being successively engageable with the blades of the preceding group.

3. A machine of the character described comprising a pair of pressing rolls, a beater plate, a compression plate complementary to the beater plate, rotary blades complementary to the beater plate for bending material passing over the first-mentioned plate, and a fan for forcing a draft downwardly through the rotary blade.

4. A machine of the character described comprising a pair of pressing rolls, a beater plate, a compression plate complementary to the beater plate, rotary blades complementary to the beater plate for bending material passing over the first-mentioned plate, a fan for forcing a draft downwardly through the rotary blade, and an endless conveyor below the rotary blade for catching material dropping from the beating operation.

5. In combination, a feed roll mount, a rotary beater assembly comprising a plurality of blades, a breaker plate vibratorily mounted on the beater feed roller mount, a cam on the rotary beater, a connection between the breaker and the cam for vibrating the said plate and means whereby the said feed roller mount can be adjusted.

6. In combination, a feed roll mount, a rotary beater assembly comprising a plurality of blades, a breaker plate vibratorily mounted on the beater feed roll mount, a cam on the rotary beater, a connection between the breaker and the cam for vibrating the said plate and means whereby the said feed roller mount can be adjusted, said adjusting means comprising a shaft carrying the roller mount, a segmental gear on the shaft, worms meshing with the gear, and a hand wheel for operating the worm.

7. In a scutching machine, a breaker bar, a plurality of beater assemblies each having a plurality of blades each rotatable about its own axis, a main axis for each assembly about which each assembly rotates, means to cause said blades and assemblies to rotate in the same direction one of said assemblies cooperating with said breaker bar to break out the non-fibrous portions of materials fed over said breaker bar and to beat the fibers to remove said non-fibrous parts.

8. A machine for separating the fibers from other constituents of plant stalks comprising upper and lower beater blade assemblies acting on opposite sides of plant stalks, a plurality of beater blades in each assembly, means to rotate each assembly about a fixed axis, means to rotate each blade about a moving axis of its own in the same direction as its assembly is rotating, and a breaker bar over which plant stalks may be fed and cooperating with the blades of said upper assembly to cause separation of the non-fibrous parts from the fibers of the stalks.

9. In a scutching machine, a breaker bar, a plurality of beater blade assemblies, a plurality of beater blades rotatable with each assembly, one of said assemblies having its blades cooperating with said breaker bar to bend the stalks of fibrous materials and remove the non-fibrous parts therefrom, an axis for each assembly around which each assembly rotates, an axis for each blade, means to rotate said blades about their axes in the same direction as said assemblies while said assemblies revolve about said assembly axes, said assemblies having their blades cooperating with each other and having the fibrous material passing between them whereby to scutch said fibrous material on opposite sides and to remove non-fibrous parts therefrom.

10. In a scutching machine, a breaker bar, a plurality of rotary beater blade assemblies, an axis for each assembly, a plurality of beater blades making up each assembly each blade having its own axis, means to rotate said blades about their own axes as said assemblies revolve about their said assembly axes, one of said assemblies having its blades cooperating with said breaker bar to bend the stalks of fibrous material and remove the non-fibrous parts therefrom, said assemblies having their blades cooperating with each other and scutching said fibrous material to remove non-fibrous parts therefrom, said blades being of closed construction and having their advance edges concave and their following edges convex.

11. In a scutching machine, a breaker bar, a beater blade movable about a fixed axis and cooperating with said breaker bar, a plurality of scutching edges on said beater blade, means to revolve said blade about a fixed axis, and means to rotate said blade about a movable axis whereby the arc of movement of said edge when adjacent to and cooperating with said breaker bar is of less magnitude than the circle whose radius is the distance from said fixed axis to said breaker bar, and means to cause said blade to revolve in the same direction about each of said movable and fixed axes.

12. In a scutching machine, a breaker bar, a beater blade movable about a fixed axis and cooperating with said breaker bar, a plurality of scutching edges on said beater blade, means to revolve said blade about a fixed axis, and means to rotate said blade about a movable axis whereby the arc of movement of said edge when adjacent to and cooperating with said breaker bar is of less magnitude than the circle whose radius is the distance from said fixed axis to said breaker bar, in combination with a beater blade revolvable about a second fixed axis, means to revolve said blade about said second axis, means to rotate said second blade about a movable axis, a plurality of scutching edges on said second blade adapted to cooperate with said first blade to scutch fibrous material between said first and second blades on both sides of said material.

13. In combination with a scutching machine as described in claim 7, means to scutch and clean the fibrous materials issuing from the beater assemblies, said beater assemblies moving the partially cleaned fiber to cause intermittent retrograde action of the fiber with said scutching means to increase the effectiveness of the scutching action of said scutching means.

DAVID E. PATTERSON.